United States Patent [19] [11] 4,039,466
Matsuda et al. [45] Aug. 2, 1977

[54] HYDROEXTRACTING COMPOSITION FOR WET AND FINELY PULVERIZED ORES

[75] Inventors: Kaneo Matsuda, Kyoto; Noboru Fujimura, Shiga, both of Japan

[73] Assignee: Sanyo Chemical Industries, Ltd., Kyoto, Japan

[21] Appl. No.: 559,779

[22] Filed: Mar. 19, 1975

[30] Foreign Application Priority Data

Mar. 20, 1974 Japan .................................. 49-31713

[51] Int. Cl.$^2$ .................................................. C09K 3/00

[52] U.S. Cl. ..................................... 252/194; 252/353; 252/532; 75/101 R

[58] Field of Search ............... 252/353, 351, 532, 551, 252/61, 194; 75/101 R

[56] References Cited

U.S. PATENT DOCUMENTS

| | | | |
|---|---|---|---|
| 3,607,778 | 9/1971 | Lincoln | 252/353 |
| 3,838,072 | 9/1974 | Smith et al. | 252/532 |
| 3,850,854 | 11/1974 | Weil | 252/532 |

*Primary Examiner*—Leland A. Sebastian
*Assistant Examiner*—Josephine Lloyd
*Attorney, Agent, or Firm*—Birch, Stewart, Kolasch and Birch

[57] ABSTRACT

A hydroextracting composition for use with wet and finely pulverized ores comprising (A) a nonionic compound having a polyoxyalkylene group in the molecule and a cloud point of not more than 35° C and (B) an anionic compound having a hydrophobic polyoxyalkylene group in the molecule.

13 Claims, No Drawings

HYDROEXTRACTING COMPOSITION FOR WET AND FINELY PULVERIZED ORES

BACKGROUND OF THE INVENTION

This invention relates to hydroextracting compositions for wet and finely pulverized ores and, more particularly, it relates to compositions for use for producing wet concentrated ores having a lower moisture content.

The wet and finely pulverized ores obtained in various ore concentration processes (such as the froth flotation, gravity concentration and like processes) are usually dehydrated or hydroextracted by filtration. The moisture content of the finely pulverized ores thus obtained varies in a wide range depending upon the kind of ore, the form of the particles, the surface property of the particles, the method used for dehydration, etc. For example, the wet and finely divided ores obtained in froth flotation (i.e., the flotation concentrate) are dehydrated by any known method to produce a cake of finely pulverized ores havings a moisture content of about 10 - 15% by weight of the total. It is preferred to decrease the moisture content of the cake as much as possible, because (1) water in the concentrated ores increases the amount of the cake, resulting in the increase of the transportation cost, especially when the cake is transported by ship, (2) the water causes an unbalancing of a ship which is laden with the ores, (3) concentrated ores containing a great amount of water form a slurry which flows out of the containers used in the transportation, and (4) such a slurry may freeze in the winter in cold areas, resulting in difficulty in handling.

Heretofore, there have been made various attempts to produce concentrated ores having a low moisture content from wet and finely pulverized ores. For example, one attempt has been made to evaporate moisture by heating the wet concentrated ores after filtering. This method requires a large amount of fuel or petroleum, resulting in an increase of the production cost, and, in addition, brings about the generation of poisonous gas ($SO_2$) in the case of sulfide ores. Another physical method comprises allowing the finely pulverized ores to stand in the air for a long period of time. This is not efficient, and the resultant ores on the surface of the pile become so dry that they are blown off causing air pollution.

There have been proposed some chemical methods for the hydroextraction of finely-divided substances other than the finely pulverized ores, which methods comprise adding a certain chemical agent to the wet substances and filtering the mixture. It has been suggested, for example, that some anionic surface active agents (such as alkylbenzene sulfonates, sodium dioctyl sulfosuccinates and polyethylene glycol-type nonionic surface active agents) may be used for the hydroextraction of finely divided coal or silica, but these agents are not practically effective in the hydroextraction of finely pulverized ores. In some cases, these agents have an adverse affect on the hydroextraction, resulting in the increase of moisture content of the ores. Moreover, these surface active agents have a tendency to move to the filtrate during the filtration. Such filtrate cannot be reused for the froth flotation which is adversely affected by the agents, and it cannot be discharged into a river or sea without removing the agents therefrom which may cause water pollution problems.

SUMMARY OF THE INVENTION

Accordingly, one object of this invention is to provide hydroextracting compositions for use with wet and finely pulverized ores having improved properties.

Another object of this invention is to provide a hydroextracting composition which can be employed efficiently and economically to give finely pulverized ores having low moisture content.

A furthr object of the invention is to provide a method for reducing the moisture content of ore cakes utilizing novel hydroextracting compositions.

Briefly, these objects and other advantages of the invention as hereinafter will become more readily apparent from the following specification and claims can be attained broadly by a hydroextracting composition for wet and finely pulverized ores which comprises a nonionic compound having a polyoxyalkylene group in the molecule and a cloud point of not more than 35° C. (A), and an anionic compound having a hydrophobic polyoxyalkylene group in the molecule (B). .

DESCRIPTION OF THE PREFERRED EMBODIMENTS

In this invention, the nonionic compound (A) has only to satisfy the above-mentioned conditions and it may be produced by any known method. Whatever method may be used for the production of the compound (A), the resultant compound is considered, in the molecular structure, to be the addition product of (1) a compound having at least one active hydrogen atom (the active hydrogencontaining compound) and (2) at least one alkylene oxide. For convenience, hereinafter, the detailed explanation will be made of the above addition product.

The active hydrogen-containing compound includes, for example, hydroxyl compounds, carboxylic compounds, nitrogen compound having active hydrogen atoms, thiol compounds and mixtures thereof.

The hydroxyl compounds include, for example, saturated or unsaturated alcohols having a straight or branched chain (such as methyl alcohol, butyl alcohol, dodecyl alcohol, oleyl alcohol, oxo alcohols and secondary alcohols), alicyclic alcohols (such as cyclohexanol), polyhydric alcohols (such as ethylene glycol, propylene glycol, glycerine, pentaerythritol, trimethylol propane and sorbitol), and phenols (such as phenol, bisphenol A, alkylphenols and arylphenols). The carboxylic compounds include, for example, caprylic acid, caproic acid, lauric acid, oleic acid, stearic acid, behenic acid, maleic acid, succinic acid, benzoic acid, phthalic acid and polymerized fatty acids. The nitrogen compounds having an active hydrogen atom include, for example, ammonia, methylamine, ethylamine, hexylamine, dodecylamine, octadecylamine, octadecenylamine, cyclohexylamine, aniline, ethylenediamine, diethylenetriamine, propylenediamine, dodecylamide, dodecyl imidazoline, and octadecylamide.

The thiol compounds include, for example, dodecyl mercaptan and mercaptobenzothiazole. There may be used compounds having at least two kinds of groups which have at least one active hydrogen atom (such as salicylic acid, ricinoleic acid, glutamic acid and thioglycolic acid).

Among these, the preferred active hydrogen-containing compounds have at least one alkyl or alkenyl group of $C_8 - C_{22}$, and they are selected from the group consisting of (1) hydroxyl compounds such as aliphatic alcohols (octyl alcohol, decyl alcohol, dodecyl alcohol, octadecyl alcohol, oxo alcohols, secondary alcohols, etc.) and alkyl phenols (octylphenols, dioctylphenols, nonylphenols, dinonylphenols, dodecylphenols, etc), (2) fatty acids such as lauric acid, palmitic acid, and stearic acid, and (3) aliphatic amines such as dioctylamine, dodecylamine, diodecylamine and octadecylamine. The more preferred active hydrogen-containing compounds are the above-mentioned hydroxyl compounds and aliphatic amines. Mixtures of varius active hydrogen-containing compounds may be used, and preferred are mixtures of hydroxyl compounds and aliphatic amines.

In the nonionic compound (A), i.e., the above-mentioned addition product, at least one alkylene oxide is added to the active hydrogen-containing compound by any method so as to impart to the resulting product a cloud point of not more than 35° C. (preferably 0° - 30° C.), which is measured in a 1% by weight aqueous solution. At the above range of cloud point, the nonionic compound (A) has the synergistic effect for hydroextraction together with the anionic compound (B).

The alkylene oxide is, for example, ethylene oxide, propylene oxide, butylene oxides and styrene oxide or mixtures thereof. The preferred alkylene oxides are ethylene oxide or a mixture of ethylene oxide and another alkylene oxide. The total amount of the alkylene oxide is generally at least 2 moles (preferably at least 6 moles, more preferably 10–100 moles) of the nonionic compound. When both ethylene oxide and another alkylene oxide are used, the molar ratio is generally 10–60 : 90–40, preferably 10 - 40 : 90 - 60. When at least two kinds of alkylene oxides are used, they may be added in the random or the block form. The preferable cloud point may be obtained by holding the appropriate balance between the hydrophobic portion and the hydrophilic portion in the nonionic compound (A). When the above-mentioned active hydrogencontaining compound is low in the hydrophobic property, the property can be improved by the addition of a hydrophobic alkylene oxide such as propylene oxide, butylene oxide, tetramethylene oxide or styrene oxide.

The nonionic compound (A), i.e., the addition product, and the method of production thereof are well known. Thus, the compound (A) may be produced by adding at least one alkylene oxide to the active hydrogen-containing compound in the presence of a basic catalyst (such as NaOH, KOH, or $NH_4OH$) at 50° - 250° C., at a gauge pressure of 0 - 10Kg./cm$^2$. It may also be prepared by the reaction of alkylene carbonates with an active hydrogen-containing compound in the presence of a catalyst.

In this invention, the anionic compound (B) is equivalent, in its molecular structure, to the anionic product obtained by adding at least one hydrophobic alkylene oxide to an active hydrogencontaining compound, and introducing at least one anionic group in the resultant intermediate, although it can be produced by any other method.

The active hydrogen-containing compound may, for example, be the same as mentioned in the explanation of the nonionic compound (A). The preferred active hydrogen compounds include, for example, the lower aliphatic ($C_1$ - $C_4$) alcohols (such as methyl alcohol, ethyl alcohol, propyl alcohol and butyl alcohol), polyols (such as ethylene glycol, propylene glycol, glycerine, trimethylolalkanes and sorbitol), dicarboxylic acids (such as maleic acid, succinic acid and phthalic acid) and lower aliphatic amines (such as monoethylamine, monopropylamine, monoethanolamine, diethanolamine, triethanolamine, ethylenediamine and propylenediamine). The more preferred active hydrogen-containing compounds are the abovementioned alcohols and polyols.

The hydrophobic alkylene oxides include, for example, propylene oxide, butylene oxide, styrene oxide and tetrahydrofuran. An amount of 20 weight % or less (preferably not more than 15%) of ethylene oxide of the total amount of alkylene oxide may be used.

The total molar amount of alkylene oxide added to the active hydrogen-containing compound may vary in a wide range depending upon the kind of alkylene oxide, the kind of active hydrogen-containing compound and the number of active hydrogen atoms therein. The number of alkylene oxide units per one active hydrogen atom is generally at least 5 moles, preferably 10 - 300 moles, more preferably 15 - 150 moles. The molecular weight of the anionic compound is generally 500 - 20,000, preferably 1,000 - 10,000.

Examples of the anionic group in the anionic compound are sulfonic, sulfate, phosphate, thiophosphate, borate and carboxylic groups. The preferred anionic groups are sulfonic, sulfate and phosphate groups. These anionic groups may be in the form of the free acid or salt thereof. The number of anionic groups in the anionic compound (B) is at least one, preferably 1 - 6, more preferably 1 - 3.

The anionic compound (B) has the above-mentioned structure, and it may be produced by any known method. Thus, it may be produced by adding the abovementioned hydrophobic alkylene oxides to the active hydrogen-containing compound, and then introducing at least one anionic group into the resulting intermediate. The introduction of the anionic group may be carried out by reacting the intermediate with concentrated sulfuric acid, fuming sulfuric acid, sulfuric anhydride, sulfamic acid, chlorosulfonic acid, sodium bisulfite, sultones, phosphorus oxychloride, lower alkyl ($C_1$ - $C_4$) phosphates, or lower alkyl ($C_1$ - $C_4$) borates. The anionic compound (B) may also be produced by adding hydrophobic alkylene oxides to a compound having both an active hydrogen atom and an anionic group. The resultant anionic compound may be changed into a salt. Examples thereof are the salts of alkali metals (Na, K, etc.), ammonium, amines (methylamine, ethylamine, mono-, di- and triethanol amines, etc.) and alkaline earth metals (Ca, Mg, etc.).

The hydroextracting composition of this invention comprises the above-mentioned nonionic compounds and anionic compounds. Each of them alone has a poor hydroextracting property, but the mixture thereof is easily soluble in water and synergistically effective in dehydrating property, especially in the treatment of ores with a particle size of less than 200 mesh.

The ratio of the nonionic compound (A) to the anionic compound (B) in the hydroextracting mixture can be varied in a wide range depending upon the kind and particle size of the wet concentrated ores, and the conditions of hydroextraction. It is usually in the range of 40 - 95(A) : 60 - 5(B), preferably 55 - 90 : 45 - 10, parts by weight.

The hydroextracting composition of the present invention may contain other additional components such as conventional surface active agents, mineral oils or organic solvents.

The hydroextracting composition of this invention can be used with wet and finely pulverized ores such as ores obtained in the conventional froth flotation method (metal sulfides, metal carbonates, etc.), ores obtained in the gravity concentration processes (metal oxides, meta silicates, metal carbonates, etc.), tailings (ores from which concentrated ores have been taken away), bauxite, magnetite sand, cassiterite, fluorite and silica.

The hydroextracting composition of this invention is added, preferably after being diluted with a solvent such as water, to the slurry of concentrated ores to be dehydrated which are obtained in various ores concentration processes as noted above (flotation, gravity concentration, etc.). Each component of the hydroextracting composition may be incorporated separately into the ores. After they are mixed homogeneously, the resulting mixture is dehydrated by a dehydrating apparatus such as a pressure filter vacuum filter, or centrifugal filter. The amount of hydroextracting composition is generally 300 - 1,000 ppm, based on the weight of dry ore.

The hydroextracting composition of this invention has various advantages: (1) It has a synergistic dehydrating property, resulting in the speed-up of the dehydration and the decrease of the moisture content of ores; (2) The resulting ores having a low moisture content can be transported at low cost and furthermore, they can be refined at low fuel cost; and (3) The hydroextracting composition is adsorbed on the surface of the ores and, consequently, the filtrate contains very little of the hydroextracting composition; thus, the filtrate can be reused for the flotation or it can be discharged into a river or sea without any pretreatment.

Having generally described this invention, a further understanding can be obtained by reference to certain specific examples which are provided herein for purposes of illustration only and are not intended to be limiting unless otherwise specified. In the examples EO, PO, BO and SO designate ethylene oxide, propylene oxide, butylene oxide and styrene oxide, respectively, and, for example, $C_4H_9O$ $(PO)_{25}(1/3EO·2/3PO)_{27}H$ represents a product obtained by adding 25 moles of propylene oxide to butyl alcohol and then adding thereto 27 moles of an alkylene oxide which is a mixture of EO and PO in a molar ratio of 1 : 2. $C_{8-12}H_{17-25}N[(EO)_7(PO)_{18}H]_2$ represents a product obtained by adding 14 moles of EO to a mixed alkylamine having 8 to 12 carbon atoms, then adding thereto 36 moles of PO.

EXAMPLE 1

1-1 Production of the nonionic compound (A)

180g (2 moles) of butylene glycol and 10G of potassium hydroxide (catalyst) were placed in an autoclave and the air was replaced with nitrogen gas. 4176g (58 moles) of butylene oxide was introduced intó the autoclave at 100° - 130° C. under a gauge pressure of 0 - 5Kg/cm$^2$ over about 4 hours to obtain polybutylene glycol. 4356g (2 moles) of the polybutylene glycol thus obtained was placed in the autoclave, and the air was replaced with nitrogen gas. 704G (16 moles) of ethylene oxide was introduced into the autoclave at 150 - 170° C under a gauge pressure of 0 - 5Kg/cm$^2$ over about 1 hour to obtain the nonionic compound A-1 shown in Table 1. The other compounds in Table 1 were produced by the same method.

The compounds (No. A-1-A-10) are the nonionic compounds used in this invention and the compounds (No. a-1-a-2) are shown for comparison.

Table 1

| No. | Nonionic compound (A) | Average M W | Cloud point, ° C |
|---|---|---|---|
| A-1 | $HO(EO)_5(BO)_{30}(EO)_5H$ | 2618 | 23 |
| A-2 | $C_4H_9O(PO)_{20}(1/3ED · 2/3PO)_{20}H$ | 2300 | 20 |
| A-3 | $C_{13}H_{27}O(EO)_4H$ | 376 | 4 |
| A-4 | 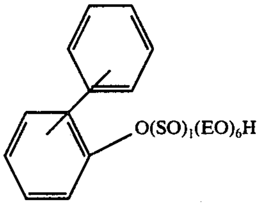 | 554 | 33 |
| A-5 | 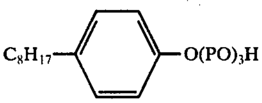 | 380 | 0≧ |
| A-6 | 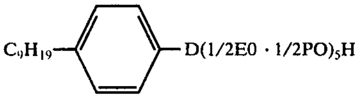 | 475 | 6 |
| A-7 | 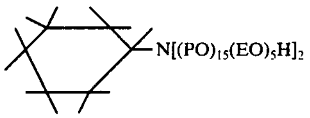 | 2278 | 12 |
| A-8 | $C_{18}H_{37}N[(1/3ED · 2/3PO)_{30}H]_2$ | 3469 | 26 |
| A-9 | O<br>‖<br>$C_{12}H_{25}C—0(2/5EO · 3/5PO)_{25}H$ | 1524 | 13 |
| A-10 | O O<br>‖ ‖<br>$HO(PO)_{10}(EO)_4—C—C_4H_8 · C—O(EO)_4(PO)_{10}H$ | 1658 | 13 |
| a-1 | $C_{15}H_{31}O(EO)_{12}H$ | 756 | 80 |

Table 1-continued

| No. | Nonionic compound (A) | Average M W | Cloud point, ° C |
|---|---|---|---|
| a-2 | 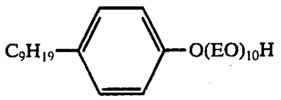 | 660 | 64 |

Note: Average MW: Average molecular weight 1-2 Production of the anionic compound (B)

500g (0.14 moles) of the compound having the formula:

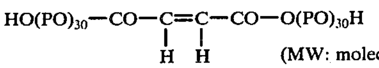 (MW=3596)

(MW: molecular weight)

was placed in an autoclave and the air was replaced with nitrogen gas. A mixture of 13.3g. (0.07 moles) of sodium bisulfite and 13.3g. of water was added, and heating was conducted with stirring at 100° - 120° C under a gauge pressure of 1 - 3Kg/cm$^2$ for about 6 hours (sulfonation). Then, 50g of toluene was added, and the water was removed by azeotropic distillation. Thereupon, 27g of sulfamic acid was added, and the mixture was heated with stirring at 80° - 100° C for 3 hours (sulfation). The product obtained was the ammonium sulfate of di(polyoxypropylene) sulfosuccinate as shown in Table 2 (No. B-1). The conversion (%) of the nonionic compound to the anionic compound was 80(%) of the theoretical quantity.

The other anionic compounds in Table 2 were produced by conventional methods.

In Table 2, the compounds (NO. B-1-B-7) are the anionic compounds used in this invention and the compounds (b-1-b-3) are enumerated for comparison.

Table 2

| No. | Anionic compound (B) | Conversion to the anionic compound % | Average M W |
|---|---|---|---|
| B-1 | 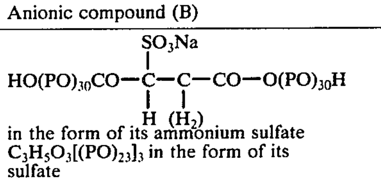 in the form of its ammonium sulfate | 80 | 3790 |
| B-2 | $C_3H_5O_3[(PO)_{23}]_3$ in the form of its sulfate | 75 | 4155 |
| B-3 | 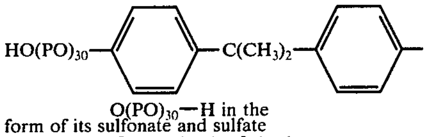 in the form of its sulfonate and sulfate | 80 | 3860 |
| B-4 | $C_3H_5(CH_2O)_3[(PO)_{25}(EO)_3H]_3$ in the form of its phosphate | 70 | 4970 |
| B-5 | $C_{10}H_{21}O(PO)_{20}H$ in the form of its phosphate | 80 | 2060 |
| B-6 | $Ho(EO)_5(PO)_{50}(EO)_5H$ in the form of its thiophosphate | 65 | 5105 |
| B-7 | $N[(PO)_{17}H]_3$ in the form of its borate | 55 | 4520 |
| b-1 | 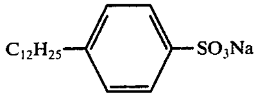 | 97 | 348 |
| b-2 | $C_{12}H_{25}OSONa$ | 90 | 224 |
| b-3 | 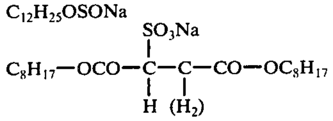 | 94 | 443 |

1-3 Test of the hydroextraction property.

a. Test method and conditions

1. Ore sample

55% by weight of an aqueous slurry of concentrated copper sulfide ores having a particle size of about 400 mesh, which were obtained by froth flotation.

2. Hydroextracting agents

They are shown in Table 3 in which Nos. 1 - 5 are the hydroextracting agents of this invention and Nos. 1' - 5' are for reference. Each agent was added to the slurry in a 5% by weight aqueous solution in the amount (active) of 300 or 600 ppm based on the weight of the dried ore.

3. Dehydration method

A porous glass plate which is attached to a funnel was immersed in the ore slurry which was gently stirred, and it was held under a pressure of 60mmHg for 90 seconds to deposit an ore cake (10 - 12 mm thick) on the surface of the plate. Then the funnel was taken out of the slurry and held under a vacuum at 20° - 25° C for 2 minutes in order to pass air through the ore cake. The water content of the resultant cake was measured by evaporating water therefrom at 120° - 130° C for 3 hours.

b. Test results

The results are given in Table 3, which shows that the hydroextracting agents of this invention have contributed significantly to the decrease of moisture content of the ores.

Table 3

| No. | Hydroextracting composition | | Amount used, ppm | Moisture content of cake % |
|---|---|---|---|---|
| 1 | A-1 | 60% by wt. | 300 | 7.0 |
| | B-1 | 40% by wt. | 600 | 7.0 |
| 2 | A-2 | 70% by wt. | 300 | 7.0 |
| | B-2(ammonium salt) | 30% by wt. | 600 | 6.6 |
| 3 | A-6 | 30% by wt. | 300 | 6.8 |
| | A-8 | 45% by wt. | 600 | 5.7 |
| | B-2 | 25% by wt. | | |
| 4 | A-3 | 70% by wt. | 300 | 6.6 |
| | A-9 | 15% by wt. | 600 | 5.5 |
| | B-4(calcium salt) | 15% by wt. | | |
| 5 | A-4 | 25% by wt. | 300 | 7.1 |
| | A-10 | 30% by wt. | 600 | 6.8 |
| | B-3(ethylenediamine salt) | 45% by wt. | | |
| 1' | a-2 | 75% by wt. | 300 | 12.2 |
| | B-1 | 25% by wt. | 600 | 12.6 |
| 2' | A-3 | 100% by wt. | 300 | 12.2 |
| | | | 600 | 12.6 |
| 3' | B-1 | 100% by wt. | 300 | 11.7 |
| | | | 600 | 10.2 |
| 4' | b-3 | 100% by wt. | 300 | 11.2 |
| | | | 600 | 10.6 |
| 5' | blank | — | — | 13.2 |

EXAMPLE 2 a. Test method and conditions

1. Ore sample.

50% by weight of an aqueous slurry of concentrated zinc sulfide ores, 85% of which has a particle size of under 400 mesh. The sample was obtained by froth flotation.

2. Hydroextracting agents.

They are shown in Table 4, in which Nos. 1 - 5 are the hydroextracting agent of this invention and Nos. 1' - 3' are for comparison. These agents were added to the slurry in the same way as described in Example 1. The amount added was 500 or 1,000ppm.

3. Dehydration method.

The method was the same as in Example 1, except that the immersing time was 1 minute, and the cake thickness was 8 - 10mm.

b. Test results

The test results are given in Table 4. The hydroextracting agents of this invention decreased the moisture content of the ores to 8% by weight or less.

Table 4

| No. | Hydroextracting composition | | Amount used, ppm | Moisture content of cake % |
|---|---|---|---|---|
| 1 | A-5 | 40% by wt. | 500 | 7.0 |
| | A-7 | 35% by wt. | 1000 | 6.5 |
| | B-4 | 25% by wt. | | |
| 2 | A-8 | 85% by wt. | 500 | 7.0 |
| | B-4 | 15% by wt. | 1000 | 6.8 |
| 3 | A-6 | 30% by wt. | 500 | 6.6 |
| | A-8 | 45% by wt. | 1000 | 6.0 |
| | B-2 | 25% by wt. | | |
| 4 | A-1 | 50% by wt. | 500 | 7.0 |
| | B-6(potassium salt) | 50% by wt. | 1000 | 6.5 |
| 5 | A-4 | 90% by wt. | 500 | 7.3 |
| | B-4(tributylamine salt) | 10% by wt. | 1000 | 6.3 |
| 1' | A-4 | 100% by wt. | 500 | 12.0 |
| 2' | B-4(tributylamine salt) | 100% by wt. | 500 | 14.3 |
| 3' | Blank | — | — | 13.6 |

EXAMPLE 3 a. Test method and conditions

1. Ore sample.

The sample was obtained by a gravity concentration process, and it constituted a 20 - 25% by weight aqueous slurry of concentrated tin oxide ores, 80% of which has a particle size of under 325 mesh.

2. Hydroextracting agents.

They are shown in Table 5 in which Nos. 1 - 4 are the hydroextracting agents of this invention and Nos. 1' - 3' are used for comparison. Each agent was used as a 0.1% by weight aqueous solution and in the amount (active) of 500ppm based on the weight of the ore (solid).

3. Dehydration method.

The slurry sample was charged into a pressure filter (1 liter of capacity; filter medium: polypropylene cloth) until a thickness of cake of 13 - 15mm was formed. Then, the aqueous solution of the dehydrating composition was added to the cake, which was then filtered. The filtration was continued at 20° -25° C under a pressure of 2.5Kg/cm$^2$ (gauge) for 2 minutes.

b. Test results

The test results are shown in Table 5.

Table 5

| No. | Hydroextracting composition | | Amount used, ppm | Moisture content of cake % |
|---|---|---|---|---|
| 1 | A-2 | 45% by wt. | 500 | 7.4 |
| | B-3(Na salt) | 55% by wt. | | |
| 2 | A-8 | 85% by wt. | 500 | 7.0 |
| | B-3 | 15% by wt. | | |
| 3 | A-4 | 35% by wt. | | |
| | A-5 | 40% by wt. | 500 | 6.2 |
| | B-1 | 25% by wt. | | |
| 4 | A-3 | 20% by wt. | | |
| | A-7 | 50% by wt. | 500 | 6.0 |
| | B-5 | 30% by wt. | | |
| 1' | a-1 | 100% by wt. | 500 | 10.8 |
| 2' | b-3 | 100% by wt. | 500 | 9.7 |
| 3' | Blank | — | — | 11.0 |

EXAMPLE 4 a. Test method and conditions

1. Test sample.

40% by weight of an aqueous slurry of finely divided quartz having a particle size of under 200 mesh.

2. Hydroextracting agents.

They are shown in Table 6, in which Nos. 1 - 4 are the agents of this invention. They were used in the same way as described in Example 1.

3. Dehydration method and conditions.

Conducted in the same manner as described in Example 1.

b. Test results

The test results are shown in Table 6.

Table 6

| No. | Hydroextracting composition | | Amount used, ppm | Moisture content of cake % |
|---|---|---|---|---|
| 1 | A-6 | 40% by wt. | 300 | 6.3 |
| | A-7 | 35% by wt. | 600 | 5.6 |
| | B-2 | 25% by wt. | | |
| 2 | A-10 | 70% by wt. | 300 | 6.7 |
| | B-1 | 30% by wt. | 600 | 6.0 |
| 3 | A-3 | 55% by wt. | 300 | 7.0 |
| | B-5(triethanolamine salt) | 45% by wt. | 600 | 6.5 |
| 4 | A-6 | 75% by wt. | 300 | 6.5 |
| | B-6(ammonium salt) | 25% by wt. | 600 | 6.2 |
| 1' | A-4 | 100% by wt. | 600 | 13.6 |
| 2' | a-1 | 100% by wt. | 600 | 12.2 |
| 3' | B-1 | 100% by wt. | 600 | 12.4 |
| 4' | b-1 | 100% by wt. | 600 | 12.0 |
| 5' | b-3 | 100% by wt. | 600 | 12.6 |
| 6' | blank | — | — | 15.5 |

What is claimed is:

1. A hydroextracting composition for wet and finely pulverized ores which comprises (A) a nonionic compound having a polyoxyalkylene group in the molecule and a cloud point of not more than 35° C. and (B) an anionic compound having a hydrophobic polyoxyalkylene group and at least one anionic group selected from the class consisting of sulfonic, sulfate, phosphate, thiophosphate, borate and carboxylic groups in the molecule, wherein the weight ratio of the nonionic compound (A) to the anionic compound (B) is 40 - 95 : 60 - 5.

2. The hydroextracting composition of claim 1, wherein the weight ratio of the nonionic compound (A) to the anionic compound (B) is 55 - 90 : 45 - 10.

3. The hydroextracting composition of claim 1, wherein the nonionic compound (A) is an addition product of a compound having at least one active hydrogen atom and at least one alkylene oxide.

4. The hydroextracting composition of claim 3, wherein the compound having at least one active hydrogen atom has at least one alkyl or alkenyl group of 8 to 22 carbon atoms selected from the group consisting of hydroxyl compounds, fatty acids, aliphatic amines and mixtures thereof.

5. The hydroextracting composition of claim 3, wherein the alkylene oxide is selected from the group consisting of ethylene oxide and a mixture of ethylene oxide and another alkylene oxide.

6. The hydroextracting composition of claim 5, wherein the molar ratio of ethylene oxide to the other alkylene oxide is 10 - 60 : 90 - 40.

7. The hydroextracting composition of claim 1, wherein the anionic compound (B) is a product obtained by adding at least one hydrophobic alkylene oxide to an active hydrogen-containing compound and introducing at least one anionic group into the resultant intermediate.

8. The hydroextracting composition of claim 7, wherein the active hydrogen-containing compound is selected from the group consisting of lower aliphatic alcohols, polyols, dicarboxylic acids, lower aliphatic amines and mixtures thereof.

9. The hydroextracting composition of claim 8, wherein the hydrophobic alkylene oxide is selected from the group consisting of propylene oxide, butylene oxide, styrene oxide and tetrahydrofuran.

10. The hydroextracting composition of claim 7, wherein the anionic group is a member selected from the group consisting of sulfonic, sulfate, borate and phosphate groups.

11. The hydroextracting composition of claim 1, wherein the cloud point of said nonionic compound (A) is from 0° to 30° C. as measured in a 1% aqueous solution thereof.

12. A process for reducing the moisture content of a wet cake of ore which comprises adding a hydroextracting composition comprising a nonionic compound having a polyoxyalkylene group in the molecule and a cloud point of not more than 35° C. and (B) an anionic compound having a hydrophobic polyoxyalkylene group and at least one anionic group selected from the class consisting of sulfonic, sulfate, phosphate, thiophosphate, borate and carboxylic groups in the molecule, wherein the weight ratio of the nonionic compound (A) to the anionic compound (B) is 40 – 95 : 60 – 5, to a wet and finely pulverized ore and filtering the mixture, thereby reducing the moisture content of said ore.

13. The process of claim 12, wherein the amount of hydroextracting composition employed is about 300 – 1,000 ppm, based on the weight of dry ore.

* * * * *